United States Patent
Bortoli et al.

(10) Patent No.: US 11,318,837 B2
(45) Date of Patent: May 3, 2022

(54) DRIVELINE FOR A VEHICLE

(71) Applicant: DANA ITALIA S.R.L., Arco (IT)

(72) Inventors: Andrea Bortoli, Arco (IT); Giulio Ornella, Maumee, OH (US); Lorenzo Serrao, Arco (IT); Fabrizio Zendri, Arco (IT)

(73) Assignee: DANA ITALIA S.R.L., Arco (IT)

( * ) Notice: Subject to any disclaimer, the term of this patent is extended or adjusted under 35 U.S.C. 154(b) by 697 days.

(21) Appl. No.: 15/999,305

(22) PCT Filed: Feb. 17, 2017

(86) PCT No.: PCT/EP2017/053692
§ 371 (c)(1),
(2) Date: Aug. 17, 2018

(87) PCT Pub. No.: WO2017/140889
PCT Pub. Date: Aug. 24, 2017

(65) Prior Publication Data
US 2019/0047416 A1 Feb. 14, 2019

(30) Foreign Application Priority Data

Feb. 17, 2016 (EP) .................................... 16425013

(51) Int. Cl.
*B60K 23/08* (2006.01)
*B60K 17/04* (2006.01)
(Continued)

(52) U.S. Cl.
CPC ................ *B60K 23/08* (2013.01); *B60K 1/00* (2013.01); *B60K 1/02* (2013.01); *B60K 17/046* (2013.01);
(Continued)

(58) Field of Classification Search
CPC ........ B60K 1/02; B60K 17/046; B60K 17/22; B60K 17/344; B60K 17/3515; B60K 23/08; B60W 10/02; B60W 10/184
See application file for complete search history.

(56) References Cited

U.S. PATENT DOCUMENTS 7,441,623 B2  10/2008  Casey et al.
7,520,354 B2  4/2009  Morrow et al.
(Continued)

FOREIGN PATENT DOCUMENTS

FR          2658259 A1   8/1991

OTHER PUBLICATIONS

European Patent Office, European Search Report with Annex, issued in earliest claimed EP priority Application No. 16425013.6, dated Aug. 23, 2016, 5 pages, European Patent Office, Munich, Germany.

(Continued)

*Primary Examiner* — Charles J Han
(74) *Attorney, Agent, or Firm* — McCoy Russell LLP

(57) ABSTRACT

A driveline for a vehicle and its method of operating are described. The driveline may have a power source and a front axle assembly drivingly engaged or selectively drivingly engaged with the power source. The front axle assembly may have a front left half shaft, a front right half shaft, a front left torque transmission control mechanism configured to control the transmission of torque to the FL half shaft, and a front right torque transmission control mechanism configured to control the transmission of torque to the FR half shaft. The driveline may also have a rear axle assembly drivingly engaged or selectively drivingly engaged with the power source. The rear axle assembly may have a rear left half shaft, a rear right half shaft, a rear left torque transmission control mechanism configured to con- (Continued)

trol the transmission of torque to the RL half shaft, a rear right torque transmission control mechanism configured to control the transmission of torque to the RR half shaft. The driveline may also have a control unit configured to independently control the FL torque transmission control mechanism, the FR torque transmission control mechanism, the RL torque transmission control mechanism, and the RR torque transmission control mechanism.

15 Claims, 10 Drawing Sheets

(51) Int. Cl.
| | |
|---|---|
| *B60K 17/35* | (2006.01) |
| *B60K 1/02* | (2006.01) |
| *B60K 17/344* | (2006.01) |
| *B60W 10/02* | (2006.01) |
| *B60W 10/184* | (2012.01) |
| *B60K 17/22* | (2006.01) |
| *B60K 1/00* | (2006.01) |

(52) U.S. Cl.
CPC ............ *B60K 17/22* (2013.01); *B60K 17/344* (2013.01); *B60K 17/3515* (2013.01); *B60W 10/02* (2013.01); *B60W 10/184* (2013.01); *B60Y 2400/73* (2013.01)

(56) References Cited

U.S. PATENT DOCUMENTS

| | | | |
|---|---|---|---|
| 7,779,952 B2 | 8/2010 | Andersson et al. | |
| 2004/0216557 A1* | 11/2004 | Griesmeier | B60K 6/52 |
| | | | 74/664 |
| 2017/0036544 A1* | 2/2017 | Satozono | B60W 30/18036 |

OTHER PUBLICATIONS

European Patent Office, International Search Report with Written Opinion, issued in PCT/EP2017/053692, dated May 10, 2017, 10 pages, European Patent Office, Rijswijk, Netherlands.

* cited by examiner

| mode | rear diff | RL clutch | RL brake | RR clutch | RR brake | front diff | FL clutch | FL brake | FR clutch | FR brake |
|---|---|---|---|---|---|---|---|---|---|---|
| standard | UN-LOCKED | ENGAGED | RELEASED | ENGAGED | RELEASED | UN-LOCKED | ENGAGED | RELEASED | ENGAGED | RELEASED |
| 100% locking | LOCKED | ENGAGED | RELEASED | ENGAGED | RELEASED | LOCKED | ENGAGED | RELEASED | ENGAGED | RELEASED |
| front axle disconnect | UN-LOCKED | ENGAGED | RELEASED | ENGAGED | RELEASED | UN-LOCKED | DIS-ENGAGED | RELEASED | DIS-ENGAGED | RELEASED |
| rear axle disconnect | UN-LOCKED | DIS-ENGAGED | RELEASED | DIS-ENGAGED | RELEASED | UN-LOCKED | ENGAGED | RELEASED | ENGAGED | RELEASED |
| left side disconnect | LOCKED | DIS-ENGAGED | RELEASED | ENGAGED | RELEASED | LOCKED | DIS-ENGAGED | RELEASED | ENGAGED | RELEASED |
| right side disconnect | LOCKED | ENGAGED | RELEASED | DIS-ENGAGED | RELEASED | LOCKED | ENGAGED | RELEASED | DIS-ENGAGED | RELEASED |

Fig. 2a

| mode | rear diff | RL clutch | RL brake | RR clutch | RR brake | front diff | FL clutch | FL brake | FR clutch | FR brake |
|---|---|---|---|---|---|---|---|---|---|---|
| left super steering | LOCKED | DIS-ENGAGED | BRAKING | ENGAGED | RELEASED | LOCKED | DIS-ENGAGED | RELEASED | ENGAGED | RELEASED |
| right super steering | LOCKED | ENGAGED | RELEASED | DIS-ENGAGED | RELEASED | LOCKED | ENGAGED | RELEASED | DIS-ENGAGED | RELEASED |
| front left traction | UN-LOCKED | DIS-ENGAGED | RELEASED | DIS-ENGAGED | RELEASED | LOCKED | ENGAGED | RELEASED | DIS-ENGAGED | RELEASED |
| front right traction | UN-LOCKED | DIS-ENGAGED | RELEASED | DIS-ENGAGED | RELEASED | LOCKED | DIS-ENGAGED | RELEASED | ENGAGED | RELEASED |
| rear left traction | LOCKED | ENGAGED | RELEASED | DIS-ENGAGED | RELEASED | UN-LOCKED | DIS-ENGAGED | RELEASED | DIS-ENGAGED | RELEASED |
| rear right traction | LOCKED | DIS-ENGAGED | RELEASED | ENGAGED | RELEASED | UN-LOCKED | DIS-ENGAGED | RELEASED | DIS-ENGAGED | RELEASED |

Fig. 2b

| mode | RL clutch | RL brake | RR clutch | RR brake | FL clutch | FL brake | FR clutch | FR brake |
|---|---|---|---|---|---|---|---|---|
| 1 (standard) | MODULATE | RELEASED | MODULATE | RELEASED | MODULATE | RELEASED | MODULATE | RELEASED |
| 2 (100% locking) | ENGAGED | RELEASED | ENGAGED | RELEASED | ENGAGED | RELEASED | ENGAGED | RELEASED |
| 3 (front axle disconnect) | MODULATE | RELEASED | MODULATE | RELEASED | DIS-ENGAGED | RELEASED | DIS-ENGAGED | RELEASED |
| 4 (rear axle disconnect) | DIS-ENGAGED | RELEASED | DIS-ENGAGED | RELEASED | MODULATE | RELEASED | MODULATE | RELEASED |
| 5 (left side disconnect) | DIS-ENGAGED | RELEASED | MODULATE | RELEASED | DIS-ENGAGED | RELEASED | MODULATE | RELEASED |
| 6 (right side disconnect) | MODULATE | RELEASED | DIS-ENGAGED | RELEASED | MODULATE | RELEASED | DIS-ENGAGED | RELEASED |

Fig. 4a

| mode | RL clutch | RL brake | RR clutch | RR brake | FL clutch | FL brake | FR clutch | FR brake |
|---|---|---|---|---|---|---|---|---|
| 7 (left super steering) | DIS-ENGAGED | BRAKING | ENGAGED | RELEASED | DIS-ENGAGED | BRAKING | ENGAGED | RELEASED |
| 8 (right super steering) | ENGAGED | RELEASED | DIS-ENGAGED | BRAKING | ENGAGED | RELEASED | DIS-ENGAGED | BRAKING |
| 9 (front left traction) | DIS-ENGAGED | RELEASED | DIS-ENGAGED | RELEASED | ENGAGED | RELEASED | DIS-ENGAGED | RELEASED |
| 10 (front right traction) | DIS-ENGAGED | RELEASED | DIS-ENGAGED | RELEASED | ENGAGED | RELEASED | ENGAGED | RELEASED |
| 11 (rear left traction) | ENGAGED | RELEASED | DIS-ENGAGED | RELEASED | DIS-ENGAGED | RELEASED | DIS-ENGAGED | RELEASED |
| 12 (rear right traction) | DIS-ENGAGED | RELEASED | ENGAGED | RELEASED | DIS-ENGAGED | RELEASED | DIS-ENGAGED | RELEASED |
| 13 (front locking) | DIS-ENGAGED | RELEASED | DIS-ENGAGED | RELEASED | ENGAGED | RELEASED | ENGAGED | RELEASED |
| 14 (rear locking) | ENGAGED | RELEASED | ENGAGED | RELEASED | DIS-ENGAGED | RELEASED | DIS-ENGAGED | RELEASED |

Fig. 4b

| mode | RL motor | RL brake | RR motor | RR brake | FL motor | FL brake | FR motor | FR brake |
|---|---|---|---|---|---|---|---|---|
| 1 (standard) | MODULATE | RELEASED | MODULATE | RELEASED | MODULATE | RELEASED | MODULATE | RELEASED |
| 2 (100% locking) | ENGAGED | RELEASED | ENGAGED | RELEASED | ENGAGED | RELEASED | ENGAGED | RELEASED |
| 3 (front axle disconnect) | MODULATE | RELEASED | MODULATE | RELEASED | DIS-ENGAGED | RELEASED | DIS-ENGAGED | RELEASED |
| 4 (rear axle disconnect) | DIS-ENGAGED | RELEASED | DIS-ENGAGED | RELEASED | MODULATE | RELEASED | MODULATE | RELEASED |
| 5 (left side disconnect) | DIS-ENGAGED | RELEASED | MODULATE | RELEASED | DIS-ENGAGED | RELEASED | MODULATE | RELEASED |
| 6 (right side disconnect) | MODULATE | RELEASED | DIS-ENGAGED | RELEASED | MODULATE | RELEASED | DIS-ENGAGED | RELEASED |

Fig. 6a

| mode | RL motor | RL brake | RR motor | RR brake | FL motor | FL brake | FR motor | FR brake |
|---|---|---|---|---|---|---|---|---|
| 7 (left super steering) | DIS-ENGAGED | BRAKING | ENGAGED | RELEASED | DIS-ENGAGED | BRAKING | ENGAGED | RELEASED |
| 8 (right super steering) | ENGAGED | RELEASED | DIS-ENGAGED | BRAKING | ENGAGED | RELEASED | DIS-ENGAGED | BRAKING |
| 9 (front left traction) | DIS-ENGAGED | RELEASED | DIS-ENGAGED | RELEASED | ENGAGED | RELEASED | DIS-ENGAGED | RELEASED |
| 10 (front right traction) | DIS-ENGAGED | RELEASED | DIS-ENGAGED | RELEASED | DIS-ENGAGED | RELEASED | ENGAGED | RELEASED |
| 11 (rear left traction) | ENGAGED | RELEASED | DIS-ENGAGED | RELEASED | DIS-ENGAGED | RELEASED | DIS-ENGAGED | RELEASED |
| 12 (rear right traction) | DIS-ENGAGED | RELEASED | ENGAGED | RELEASED | DIS-ENGAGED | RELEASED | DIS-ENGAGED | RELEASED |
| 13 (front locking) | DIS-ENGAGED | RELEASED | DIS-ENGAGED | RELEASED | ENGAGED | RELEASED | ENGAGED | RELEASED |
| 14 (rear locking) | ENGAGED | RELEASED | ENGAGED | RELEASED | DIS-ENGAGED | RELEASED | DIS-ENGAGED | RELEASED |
| 15 (electric drive) | MODULATE | RELEASED | MODULATE | RELEASED | MODULATE | RELEASED | MODULATE | RELEASED |

Fig. 6b

DRIVELINE FOR A VEHICLE

BACKGROUND OF THE INVENTION

The invention relates to a driveline for a vehicle, in particular to a driveline for an off-highway vehicle. The invention further relates to methods of operating the driveline.

In order to improve vehicle control, systems such as anti blocking systems (ABS), electronic stability control (ESP) and traction control systems (TCS) have been implemented to increase vehicle stability and safety. However, so far the aforementioned vehicle stability and safety systems are commonplace only in passenger cars.

BRIEF SUMMARY OF THE INVENTION

It is therefore an object of the present invention to design a vehicle driveline capable of providing improved vehicle control which is preferably suited for use in heavy duty vehicles such as off-highway vehicles.

This object is solved by a driveline for a vehicle according to claim 1. Special embodiments of the proposed driveline are described in the dependent claims.

Thus, the presently proposed driveline comprises at least
a power source;
a front axle assembly drivingly engaged or selectively drivingly engaged with the power source, the front axle assembly comprising:
  a front left (FL) half shaft,
  a front right (FR) half shaft,
  a front left (FL) torque transmission control mechanism configured to control the transmission of torque to the FL half shaft, and
  a front right (FR) torque transmission control mechanism configured to control the transmission of torque to the FR half shaft;
a rear axle assembly drivingly engaged or selectively drivingly engaged with the power source, the rear axle assembly comprising:
  a rear left (RL) half shaft,
  a rear right (RR) half shaft,
  a rear left (RL) torque transmission control mechanism configured to control the transmission of torque to the RL half shaft, and
  a rear right (RR) torque transmission control mechanism configured to control the transmission of torque to the RR half shaft; and
a control unit configured to independently control the FL torque transmission control mechanism, the FR torque transmission control mechanism, the RL torque transmission control mechanism, and the RR torque transmission control mechanism.

The power source may include an engine such as an internal combustion engine (ICE) or an electric engine, for example. The front axle assembly may be drivingly engaged or selectively drivingly engaged with the power source through at least one of a gear box, a torque converter, one or more clutches and one or more drive shafts. Likewise, the rear axle assembly may be drivingly engaged or selectively drivingly engaged with the power source through at least one of a gear box, a torque converter, one or more clutches and one or more drive shafts.

Each of the half shafts (FL, FR, RL, RR) may be drivingly engaged or selectively drivingly engaged with a ground engaging structure, preferably through a corresponding (FL, FR, RL, RR) reduction drive. In each case (FL, FR, RL, RR), the ground engaging structure may include one or more wheels, for example.

The control unit may include one or more processors/microprocessors and/or one or more FPGAs, for example. The torque transmission control mechanisms are typically configured to be actuated electrically and/or mechanically, in particular hydraulically. For example, the torque transmission control mechanism may be actuated by actuating one or more hydraulic valves configured to control the flow of a hydraulic fluid in one or more hydraulic circuits.

The front axle assembly may include a front locking differential. Locking differentials are generally known in the art of automotive transmissions. The front locking differential is typically configured to selectively lock the FL half shaft and/or the FR half shaft to a front differential casing of the front locking differential, for example by means of a clutch mechanism. However, it is understood that the front locking differential may include other mechanisms for selectively locking the FL half shaft and/or the FR half shaft to the front differential casing. When the front locking differential is in a locked state, the FL half shaft rotates at the same speed as the front differential casing and/or the FR half shaft rotates at the same speed as the front differential casing. When the front locking differential is in an unlocked state the FL half shaft, the FR half shaft and the front differential casing may rotate at different speeds. The front differential casing may be drivingly engaged or selectively drivingly engaged with the power source.

Additionally or alternatively the rear axle assembly may include a rear locking differential. The rear locking differential is typically configured to selectively lock the RL half shaft and/or the RR half shaft to a rear differential casing of the rear locking differential, for example by means of a clutch mechanism. However, it is understood that the rear locking differential may include other mechanisms for selectively locking the RL half shaft and/or the RR half shaft to the rear differential casing. When the rear locking differential is in a locked state, the RL half shaft rotates at the same speed as the rear differential casing and/or the RR half shaft rotates at the same speed as the rear differential casing. When the rear locking differential is in an unlocked state the RL half shaft, the RR half shaft and the rear differential casing may rotate at different speeds. The rear differential casing may be drivingly engaged or selectively drivingly engaged with the power source.

The FL torque transmission control mechanism may comprise a front left (FL) clutching device configured to selectively drivingly engage the FL half shaft with the front differential casing. Additionally or alternatively, the FR torque transmission control mechanism may comprise a front right (FR) clutching device configured to selectively drivingly engage the FR half shaft with the front differential casing. Additionally or alternatively, the RL torque transmission control mechanism may comprise a rear left (RL) clutching device configured to selectively drivingly engage the RL half shaft with the rear differential casing. Additionally or alternatively, the RR torque transmission control mechanism may comprise a rear right (RR) clutching device configured to selectively drivingly engage the RR half shaft with the rear differential casing.

At least one of or each of the FL clutching device, the FR clutching device, the RL clutching device and the RR clutching device may have an engaged state and a disengaged state and may be selectively switched between the engaged state and the disengaged state. When the FL/FR clutching device is in the engaged state, torque may be transmitted from the front differential casing to the FL/FR half shaft. When the FL/FR clutching device is in the disengaged state, the transmission of torque between the front differential casing and the FL/FR half shaft is interrupted. When the RL/RR clutching device is in the engaged state, torque may be transmitted from the rear differential casing to the RL/RR half shaft. When the RL/RR clutching device is in the disengaged state, the transmission of torque between the rear differential casing and the RL/RR half shaft is interrupted. At least one of or each of the clutching devices may be configured to be actuated electrically and/or mechanically, in particular hydraulically.

Additionally or alternatively, the FL torque transmission control mechanism may comprise a front left (FL) epicyclic gear train and a front left (FL) torque transmission control device, the FL torque transmission control device configured to control the gear ratio of the FL epicyclic gear train. Additionally or alternatively, the FR torque transmission control mechanism may comprise a front right (FR) epicyclic gear train and a front right (FR) torque transmission control device, the FR torque transmission control device configured to control the gear ratio of the FR epicyclic gear train. Additionally or alternatively, the RL torque transmission control mechanism may comprise a rear left (RL) epicyclic gear train and a rear left (RL) torque transmission control device, the RL torque transmission control device configured to control the gear ratio of the RL epicyclic gear train. Additionally or alternatively, the RR torque transmission control mechanism may comprise a rear right (RR) epicyclic gear train and a rear right (RR) torque transmission control device, the RR torque transmission control device configured to control the gear ratio of the RR epicyclic gear train. At least one of or each of the torque transmission control devices may be configured to be controlled through the control unit.

In each case (FL, FR, RL, RR), the epicyclic gear train may have an input drivingly engaged or selectively drivingly engaged with the power source, and an output drivingly engaged or selectively drivingly engaged with the corresponding (FL, FR, RL, RR) half shaft. In each case (FL, FR, RL, RR), the epicyclic gear train may further comprise a transmission gear for selectively transmitting torque between the input and the output. In each case (FL, FR, RL, RR), the torque transmission control device may be configured to selectively lock the input of the epicyclic gear train to the output of the epicyclic gear train according to a predetermined gear ratio and to selectively interrupt the transmission of torque between the input and the output of the epicyclic gear train. In each case (FL, FR, RL, RR), the torque transmission control device may further be configured to continually modulate the gear ratio of the epicyclic gear train between neutral (no transmission of torque between the input and the output) and the predetermined gear ratio.

For example, in each case (FL, FR, RL, RR) the epicyclic gear train may include a planetary gear train, the planetary gear train comprising a sun gear, a ring gear and a planetary carrier carrying one or more planetary gears, as is known in the art. One of the sun gear, the ring gear and the planetary carrier may function as an input of the planetary gear train and may be drivingly engaged or selectively drivingly engaged with the power source. Another one of the sun gear, the ring gear and the planetary carrier may function as an output of the planetary gear train and may be drivingly engaged or selectively drivingly engaged with the corresponding half (FL, FR, RL, RR) shaft in each case. The remaining one of the sun gear, the ring gear and the planetary carrier may then function as a transmission gear for selectively transmitting torque between the input and the output of the planetary gear train.

In each case (FL, FR, RL, RR), the torque transmission control device may comprise a clutch configured to selectively lock and/or frictionally engage the transmission gear of the epicyclic gear train to/with a stationary portion of the driveline. Additionally or alternatively, the torque transmission control device may comprise a motor in each case (FL, FR, RL, RR), the motor preferably configured as an electric motor or as a hydraulic motor, the motor fixed to a stationary portion of the driveline, and an output of the motor engaged with the transmission gear of the corresponding epicyclic gear train.

In each case (FL, FR, RL, RR), the input and the output of the epicyclic gear train may be locked to one another according to a predetermined gear ratio by locking the transmission gear of the epicyclic gear train to the stationary portion using the corresponding torque transmission control device. The predetermined gear ratio between the input and the output of the epicyclic gear train may be 1:1. However, it is understood that other gear ratios may result, depending on the design of the epicyclic gear train. Thus, in each case (FL, FR, RL, RR) the torque transmission control device may be used to selectively lock the corresponding half shaft to the power source, thereby effectively functioning as a locking differential. Furthermore, in each case (FL, FR, RL, RR) the transmission of torque between the input and the output of the epicyclic gear train may be interrupted by disengaging the transmission gear of the epicyclic gear train from the stationary portion. Also, in each case (FL, FR, RL, RR) the gear ratio between the input and the output of the epicyclic gear train may be continuously varied by modulating the degree of frictional engagement between the transmission gear of the epicyclic gear train and the stationary portion.

The input of the FL epicyclic gear train and the input of the FR epicyclic gear train may be permanently locked to one another and may be drivingly engaged or selectively drivingly engaged with the power source. Additionally or alternatively, the input of the RL epicyclic gear train and the input of the RR epicyclic gear train may be permanently locked to one another and may be drivingly engaged or selectively drivingly engaged with the power source.

The front axle assembly may further comprise at least one of or each of a front left (FL) brake for selectively braking the FL half shaft or for selectively a front left (FL) wheel, and a front right (FR) brake for selectively braking the FR half shaft or for selectively a front right (FR) wheel. The control unit may be configured to independently control the FL brake and the FR brake.

Additionally or alternatively, the rear axle assembly may further comprise at least one of or each of a rear left (RL) brake for selectively braking the RL half shaft or for selectively a rear left (RL) wheel, and a rear right (RR) brake for selectively braking the RR half shaft or for selectively a rear right (RR) wheel. The control unit may be configured to independently control the RL brake and the RR brake.

The driveline may further comprise one or more speed sensors. For example, the driveline may comprise at least one of or each of: a FL speed sensor for determining a rotational speed of the FL half shaft or of the FL wheel, a FR speed sensor for determining a rotational speed of the FR half shaft or of the FR wheel, a RL speed sensor for determining a rotational speed of the RL half shaft or of the RL wheel, and a RR speed sensor for determining a rotational speed of the RR half shaft or of the RR wheel. The speed sensors may be configured as magnetic/inductive sensors and/or as optical sensors, for example.

The speed sensor(s) may be configured to transmit speed data to the control unit. The control unit may be configured to receive the speed data. And the control unit may be configured to independently control the FL torque transmission control mechanism, the FR torque transmission control mechanism, the RL torque transmission control mechanism and the RR torque transmission control mechanism based on the speed data received from the speed sensor(s).

The driveline may be operated according to a number of different modes of operation. For example, an operator of the vehicle may manually select one of the modes of operation according to a desired driving maneuver. The operator may select the desired mode of operation using a first input device such as a touchscreen, one or more switches, one or more knobs, one or more levers, one or more pedals or the like. Once a mode of operation has been selected, the control unit may control the torque transmission control mechanisms (FL, FR, RL, RR), the locking differentials and the brakes (FL, FR, RL, RR) based on vehicle sensor data and/or based on an input provided by the operator using a second input device. The sensor data may comprise vehicle speed data and/or gearbox data, for example. The vehicle speed data may comprise at least one of or all of FL wheel speed data, FR wheel speed data, RL wheel speed data and RR wheel speed data. The gearbox data may comprise information on a drive ratio between a gearbox input and a gearbox output, for example. The second input device may include at least one of or all of an accelerator pedal, a brake pedal and a steering wheel, for example.

In one mode of operating the proposed driveline (left side disconnect), the control unit may control the torque transmission control mechanisms (FL, FR, RL, RR) such that they simultaneously:
  transmit torque to the FR half shaft and to the RR half shaft, and
  interrupt the transmission of torque to the FL half shaft and to the RL half shaft.

In this mode (left side disconnect), the control unit is may additionally lock the FR half shaft and the RR half shaft to the power source. This may include the control unit commanding the front locking differential to lock the FR half shaft to the front differential casing and commanding the rear locking differential to lock the RR half shaft to the rear differential casing, for example.

In another mode of operating the proposed driveline (right side disconnect), the control unit may control the torque transmission control mechanisms (FL, FR, RL, RR) such that they simultaneously:
  transmit torque to the FL half shaft and to the RL half shaft, and
  interrupt the transmission of torque to the FR half shaft and to the RR half shaft.

In this mode (right side disconnect), the control may additionally lock the FL half shaft and the RL half shaft to the power source. This may include the control unit commanding the front locking differential to lock the FL half shaft to the front differential casing and commanding the rear locking differential to lock the RL half shaft to the rear differential casing.

In another mode of operating the proposed driveline (left super steering), the control unit may simultaneously:
  control the torque transmission control mechanisms (FL, FR, RL, RR) to transmit torque to the FR half shaft and to the RR half shaft and to interrupt the transmission of torque to the FL half shaft and to the RL half shaft,
  control the FL brake and the RL brake to brake at least one of or all of the FL half shaft, the FL wheel, the RL half shaft and the RL wheel, and
  control the FR brake and the RR brake to release the FR half shaft, the FR wheel, the RR half shaft and the RR wheel.

In this mode (left super steering), the control unit may additionally lock the FR half shaft and/or the RR half shaft to the power source. This may include the control unit commanding the front locking differential to lock the FR half shaft to the front differential casing and commanding the rear locking differential to lock the RR half shaft to the rear differential casing.

In another mode of operating the proposed driveline (right super steering), the control unit may simultaneously:
  control the torque transmission control mechanisms (FL, FR, RL, RR) to transmit torque to the FL half shaft and to the RL half shaft and to interrupt the transmission of torque to the FR half shaft and to the RR half shaft,
  control the FR brake and the RR brake to brake at least one of or all of the FR half shaft, the FR wheel, the RR half shaft and the RR wheel, and
  control the FL brake and the RL brake to release the FL half shaft, the FL wheel, the RL half shaft and the RL wheel.

In this mode (right super steering), the control unit may additionally lock the FL half shaft and/or the RL half shaft to the power source. This may include the control unit commanding the front locking differential to lock the FL half shaft to the front differential casing and commanding the rear locking differential to lock the RL half shaft to the rear differential casing.

In another mode of operating the proposed driveline (rear disconnect), the control unit may control the torque transmission control mechanisms (FL, FR, RL, RR) such that they simultaneously:
  transmit torque to the FL half shaft and to the FR half shaft, and
  interrupt the transmission of torque to the RL half shaft and to the RR half shaft.

In another mode of operating the proposed driveline (front disconnect), the control unit may control the torque transmission control mechanisms (FL, FR, RL, RR) such that they simultaneously:
  transmit torque to the RL half shaft and to the RR half shaft, and
  interrupt the transmission of torque to the FL half shaft and to the FR half shaft.

In another mode of operating the proposed driveline (single wheel traction), the control unit may control the torque transmission control mechanisms (FL, FR, RL, RR) such that they transmit torque to only one of the four half shafts (FL, FR, RL, RR) and, simultaneously, interrupt the transmission of torque to the remaining three half shafts.

BRIEF DESCRIPTION OF THE DRAWINGS

Preferred embodiments of the presently proposed driveline and of various methods of operating the driveline are described in the following detailed description and are depicted in the accompanying drawing in which:

FIG. 2a a table describing modes of operating the driveline of FIGS. 1a and 1b;

FIG. 2b a table describing further modes of operating the driveline of FIGS. 1a and 1b;

FIG. 4a a table describing modes of operating the driveline of FIG. 3;

FIG. 4b a table describing further modes of operating the driveline of FIG. 3.

FIG. 6a a table describing modes of operating the driveline of FIG. 5; and

FIG. 6b a table describing further modes of operating the driveline of FIG. 5.

DETAILED DESCRIPTION OF THE INVENTION

Figure 1A:
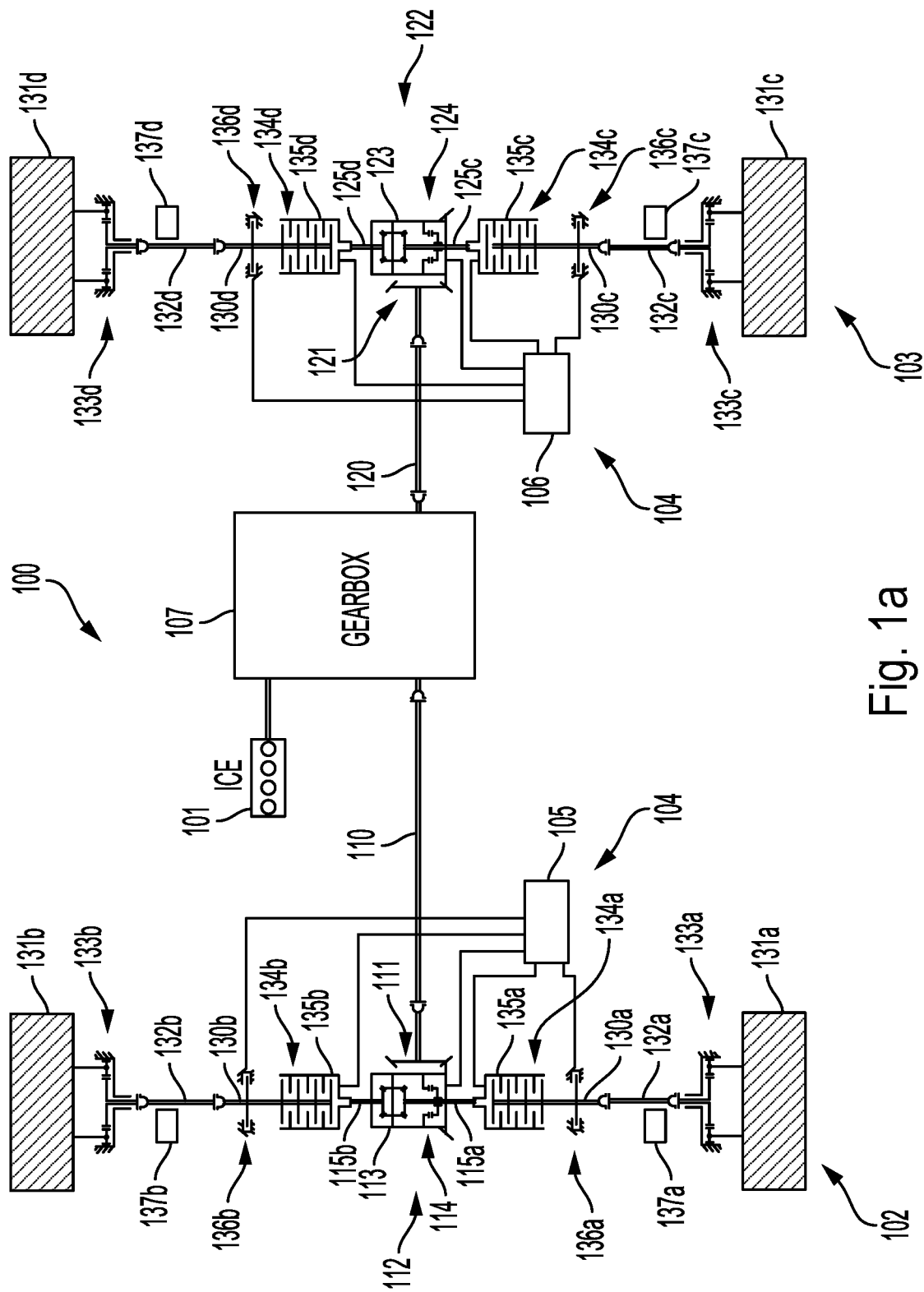
FIG. 1a a driveline for a vehicle according to a first embodiment.

FIG. 1a shows a driveline 100 for a vehicle. The vehicle may be an off-highway vehicle. Off-highway vehicles may include but are not limited to agricultural vehicles such as tractors or harvesters, mining vehicles, construction equipment such as excavators, wheel loaders and material handling vehicles such as forklift trucks, for example.

The driveline 100 includes a power source 101, a front axle assembly 102, a rear axle assembly 103 and a control unit 104. Here, the control unit 104 comprises a front controller 105 for controlling the front axle assembly 102 and a rear controller 106 for controlling the rear axle assembly 103. The front controller 105 and the rear controller 106 are configured to communicate and exchange data with one another (not shown). The power source 101 is an internal combustion engine (ICE). Alternatively, the power source 101 could be configured as an electric engine, for example.

The front axle assembly 102 includes a front left (FL) half shaft 130a, a front right (FR) half shaft 130b and a front locking differential 112. The FL half shaft 130a is drivingly engaged with a FL wheel 131a through a FL cardan shaft 132a and through a FL reduction drive 133a. The FR half shaft 130b is drivingly engaged with a FR wheel 131b through a FL cardan shaft 132b and through a FR reduction drive 133b.

The front locking differential 112 may be of a known type. The front locking differential 112 includes a front differential casing 113, a FL output 115a, a FR output 115b and a mechanism 114 for selectively locking the FL output 115a and the FR output 115b to the front differential casing 113. The mechanism 114 may include one or more clutches, for example. The front controller 105 may selectively set the front locking differential 112 to one of a locked state and an unlocked state. In the locked state, the mechanism 114 rigidly locks the FL output 115a and the FR output 115b to the front differential casing 113 so that the FL output 115a and/or the FR output 115b rotate at the same speed as the front differential casing 113. In the unlocked state, the mechanism 114 is released so that the FL output 115a, the FR output 115b and the front differential casing 113 may rotate at different speeds. The front locking differential 112, in particular the front differential casing 113, is selectively drivingly engaged with the power source 101 through a gearbox 107, a front drive shaft 110 and a front bevel gear set 111.

The front axle assembly 102 further includes a FL torque transmission control mechanism 134a configured to control the transmission of torque to the FL half shaft 130a and to the FL wheel 131a, and a FR torque transmission control mechanism 134b configured to control the transmission of torque to the FR half shaft 130b and to the FR wheel 131b.

The FL torque transmission control mechanism 134a includes a FL clutching device 135a. The FL clutching device 135a may be a SAHR (spring actuated hydraulic release) type clutch. In the driveline 100 of FIG. 1a the clutching device 135a is configured as a multi-disc clutch. The front controller 105 is configured to selectively drivingly engage the FL half shaft 130a with the power source 101 through the FL torque transmission control mechanism 134a. In particular, the FL torque transmission control mechanism 134a may drivingly engage the FL half shaft 130a with the power source 101 through the FL output 115a of the front locking differential 112. That is, the controller 105 is configured to control the FL torque transmission control mechanism 134a to selectively one of transmit torque from the power source 101 to the FL half shaft 130a and to the FL wheel 131a, and interrupt the transmission of torque to the FL half shaft 130a and to the FL wheel 131a.

The FR torque transmission control mechanism 134b includes a FR clutching device 135b. The FR clutching device 135b may be a SAHR (spring actuated hydraulic release) type clutch. In the driveline 100 of FIG. 1a the clutching device 135b is configured as a multi-disc clutch. The front controller 105 is configured to selectively drivingly engage the FR half shaft 130b with the power source 101 through the FR torque transmission control mechanism 134b. In particular, the FR torque transmission control mechanism 134b may drivingly engage the FR half shaft 130b with the power source 101 through the FR output 115b of the front locking differential 112. That is, the controller 105 is configured to control the FR torque transmission control mechanism 134b to selectively one of transmit torque from the power source 101 to the FR half shaft 130b and to the FR wheel 131b, and interrupt the transmission of torque to the FR half shaft 130b and to the FR wheel 131b.

The front axle assembly 102 further includes a FL brake 136a and a FR brake 136b. The FL brake 136a and the FR brake 136b are configured to selectively brake the FL half shaft 130a and the FR half shaft 130b, respectively. Alternatively, the FL brake 136a and the FR brake 136b could be configured to selectively brake the FL wheel 131a and the FR wheel 131b, respectively. The FL brake 136a and the FR brake 136b are configured to be controlled by means of the front controller 105.

The front axle assembly 102 further includes a FL speed sensor 137a and a FR speed sensor 137b for measuring a rotational speed of the FL half shaft 130a or of the FL wheel 131a and for measuring a rotational speed of the FR half shaft 130b or of the FR wheel 131b, respectively. The speed sensors 137a, 137b are configured to communicate measured speed data to the front controller 105. The front controller 105 is configured to control the front locking differential 112, the torque transmission control mechanisms 134a, 134b and the brakes 136a, 136b based on the measured speed data communicated to the front controller 105 by the speed sensors 137a, 137b.

To a person of ordinary skill in the art of automotive transmissions it is readily evident from FIG. 1a that the design and the mode of operation of the rear axle assembly 103 are identical to the design and to the mode of operation of the front axle assembly 102 described above. Specifically, the rear axle assembly 103 includes a rear locking differential 122 comprising a rear differential casing 123, a mechanism 124, a rear left (RL) output 125c and a rear right (RR) output 125d. Like the front locking differential 112, the rear locking differential 122, in particular the rear differential casing 123, is selectively drivingly engaged with the power source 101 through the gearbox 107, a rear drive shaft 120 and a rear bevel gear set 121.

In analogy to the front axle assembly 102, the rear axle assembly comprises RL and RR half shafts 130c, 130d; RL and RR wheels 131c, 131d; RL and RR cardan shafts 132c, 132d; RL and RR reduction drives 133c, 133d; RL and RR torque transmission control mechanisms 134c, 134d comprising clutching devices 135c, 135d, respectively; RL and RR brakes 136c, 136d; and RL and RR speed sensors 137c, 137d. It is readily apparent to a skilled artisan that the components 122, 123, 124, 125c, 125d, 130c-137c and 130d-137d of the rear axle assembly 103 may have the same design and may be operated according to the same mode of operation as the corresponding components 112, 113, 114, 115a, 115b, 130a-137a and 130b-137b of the front axle assembly, respectively. In particular, the rear controller 106 may be configured to control the rear locking differential 122, the torque transmission control mechanisms 134c, 134d and the brakes 136c, 136d based on measured speed data communicated to the rear controller 106 by the speed sensors 137c, 137d.

Figure 1B:
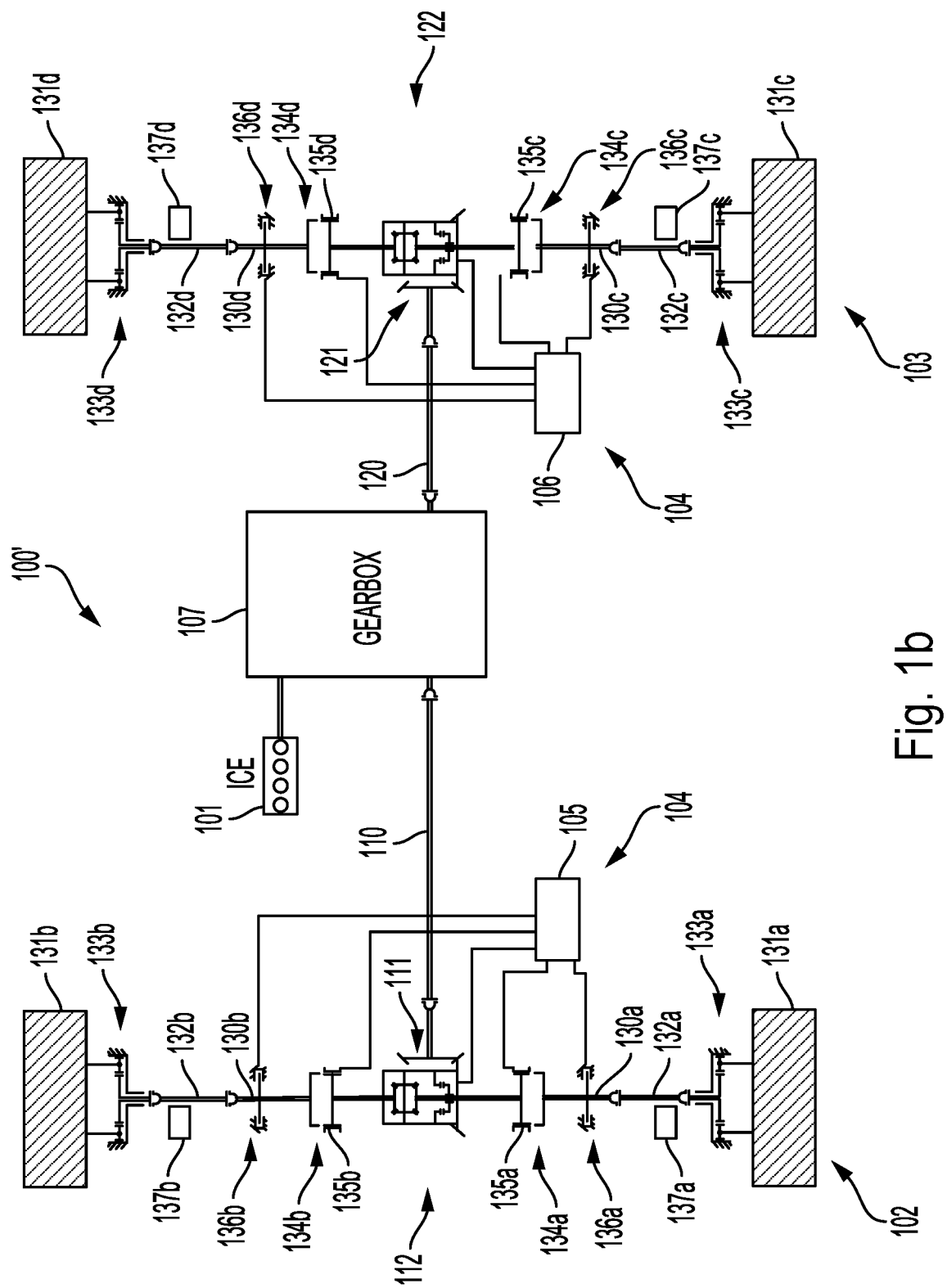
FIG. 1b a driveline for a vehicle according to a second embodiment.

FIG. 1b shows another driveline 100' which is a variant of the driveline 100 illustrated in FIG. 1a. Here and in the following recurring features are designated by the same reference signs. The driveline 100' of FIG. 1b differs from the driveline 100 of FIG. 1a in that the clutching devices 135a-d of the torque transmission control mechanisms 134a-d are configured as dog clutches. To a skilled artisan it is readily apparent that otherwise the driveline 100' of FIG. 1b includes the same components and may be operated according to the same modes of operation as the driveline 100 of FIG. 1a.

The tables shown in FIGS. 2a, 2b illustrate various modes or methods of operating the functionally equivalent drivelines 100, 100' of FIGS. 1a and 1b. Each row of the tables shown in FIGS. 2a, 2b corresponds to one mode or method of operation. Each mode of operation is associated with a different set of control states of the rear locking differential 122, the RL clutching device 135c, the RL brake 136c, the RR clutching device 135d, the RR brake 136d, the front locking differential 112, the FL clutching device 135a, the FL brake 136a, the FR clutching device 135b and the FR brake 136b.

In mode 1 (standard) the control unit 104 sets the locking differentials 112, 122 to the unlocked state, respectively, thereby allowing the half shafts 130a-d and the differential casings 113, 123 to rotate at different speeds. Simultaneously, the control unit 104 sets the clutching devices 135a-d to an engaged state, respectively, so that torque is transmitted from the power source 101 to all half shafts 130a-d and to all wheels 131a-d. At the same time, the control unit 104 may release all brakes 136a-d. The operator of the vehicle may nonetheless manually activate the brakes 136a-d to brake the vehicle, if needed. The brakes 136a-d may be activated through a brake pedal, one or more levers or one or more switches, for example. When operated in mode 1, the driveline behaves as known drivelines featuring an open rear differential and an open front differential.

Mode 2 (100% locking) differs from mode 1 in that the control unit 104 sets the locking differentials 112, 122 to the locked state, respectively, thereby rigidly locking the front half shafts 130a, 130b to the front differential casing 113 and rigidly locking the rear half shafts 130c, 130d to the rear differential casing 123. Mode 2 may force both axles and all four wheels to rate at the same speed. It may be particularly useful when traveling on slippery ground.

Mode 3 (front axle disconnect) differs from mode 1 in that the control unit 104 sets the front clutching devices 135a, 135b to a disengaged state so that no torque is transmitted to the front half shafts 130a, 130b and to the front wheels 131a, 131b. Mode 3 may be particularly suitable when the vehicle travels at high speed or when the front wheels have limited traction.

Mode 4 (rear axle disconnect) differs from mode 1 in that the control unit 104 sets the rear clutching devices 135c, 135d to a disengaged state so that no torque is transmitted to the rear half shafts 130c, 130d and to the rear wheels 131c, 131d. Mode 4 may be particularly suitable when the vehicle travels at high speed or when the rear wheels have limited traction.

Mode 5 (left side disconnect) differs from mode 1 in that the control unit 104 sets the left clutching devices 135a, 135c to a disengaged state so that no torque is transmitted to the left half shafts 130a, 130c and to the left wheels 131a, 131c. Simultaneously, the control unit 104 sets the locking differentials 112, 122 to the locked state, thereby locking the right half shafts 130b, 130d to the differential casings 113, 123, respectively, and releases the right brakes 136b, 136d. Mode 5 may be particularly suitable when the left wheels have limited traction.

Mode 6 (right side disconnect) differs from mode 1 in that the control unit 104 sets the right clutching devices 135b, 135d to a disengaged state so that no torque is transmitted to the right half shafts 130b, 130d and to the right wheels 131b, 131d. Simultaneously, the control unit 104 sets the locking differentials 112, 122 to the locked state, thereby locking the left half shafts 130a, 130c to the differential casings 113, 123, respectively, and releases the left brakes 136a, 136c. Mode 6 may be particularly suitable when the right wheels have limited traction.

Mode 7 (left super steering) differs from mode 5 (left side disconnect) in that the control unit 104 additionally sets at least one or both of the left brakes 136a, 136c to a braking state in which they inhibit rotation of at least one or both of the left half shafts 130a, 130c and/or of the left wheels 131a, 131c. Mode 7 is particularly useful when driving the vehicle around a tight left corner.

Mode 8 (right super steering) differs from mode 6 (right side disconnect) in that the control unit 104 additionally sets at least one of or both of the right brakes 136b, 136d to a braking state in which they inhibit rotation of at least one of or both of the right half shafts 130b, 130d and/or of the right wheels 131b, 131d. Mode 8 is particularly useful when driving the vehicle around a tight right corner.

In modes 9 to 12 (FL, FR, RL, RR single wheel traction, respectively) the control unit 104 sets only one of the clutching devices 135a-d to the engaged state, while simultaneously setting the remaining ones of the clutching devices 135a-d to the disengaged state. At the same time, the control unit 104 locks the single wheel in traction to the corresponding differential casing and releases all brakes 136a-d.

Figure 3:
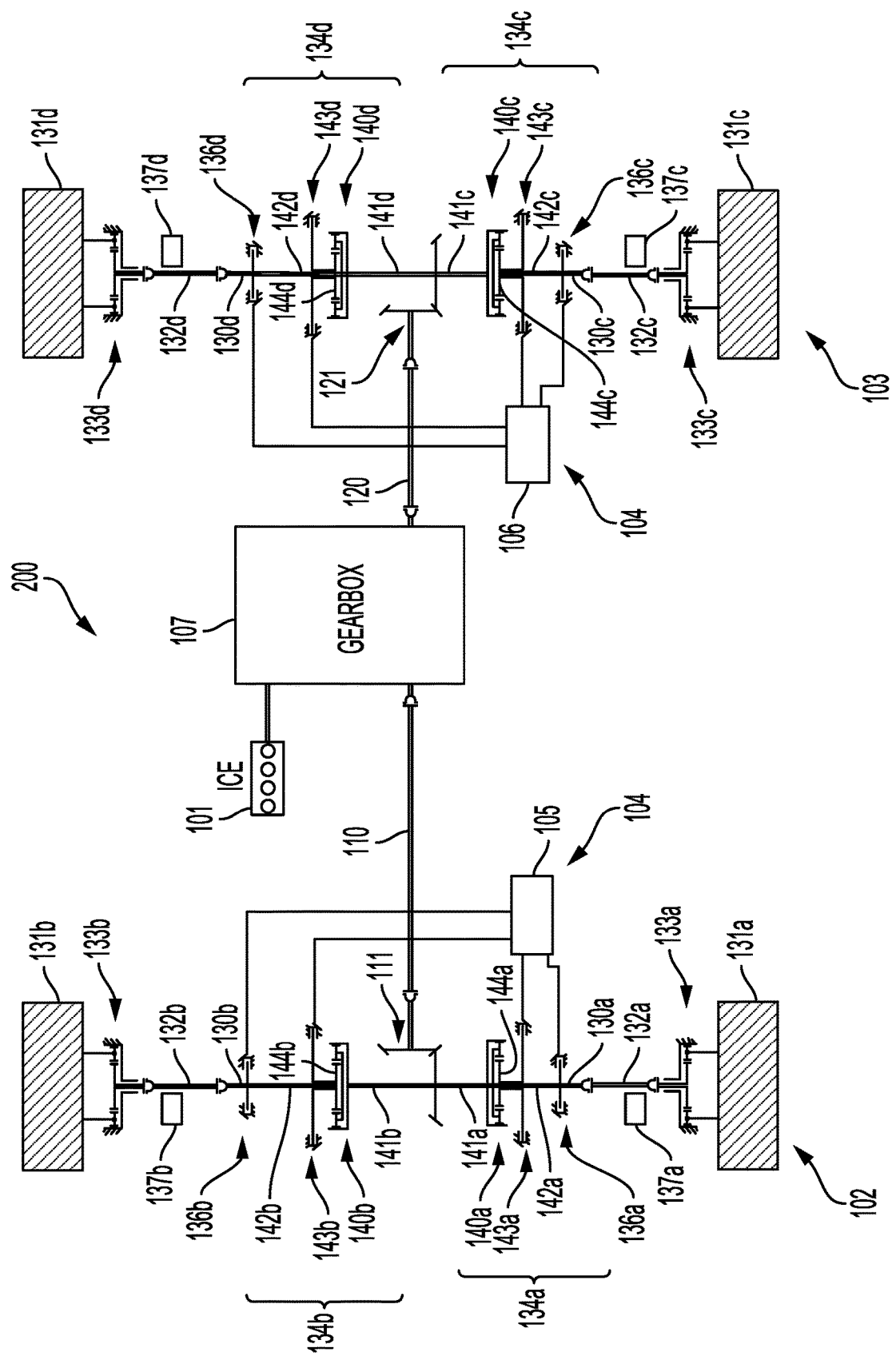
FIG. 3 a driveline for a vehicle according to a third embodiment.

FIG. 3 shows a driveline 200 for a vehicle which is a variant of the drivelines 100, 100' of FIGS. 1a, 1b. As before, recurring features are designated by the same reference signs. The driveline 200 of FIG. 3 differs from the drivelines 100, 100' of FIGS. 1a, 1b in that the front axle assembly 102 and the rear axle assembly 103 feature no locking differentials and in that the torque transmission control mechanisms 134a-d feature a modified design and a modified mode of operation. As will be readily apparent to a person of ordinary skill in the art of automotive transmissions, the design and the mode of operation of the remaining components of the driveline 200 of FIG. 3 is identical to the design and to the mode of operation of the remaining components of the drivelines 100, 100' of FIGS. 1a, 1b.

Specifically, the front left (FL) torque transmission control mechanism 134a includes a FL epicyclic gear train 140a with a FL input 141a, a FL output 142a and a FL transmission gear 144a for selectively transmitting torque between the FL input 141a and the FL output 142a. The FL output 142a is drivingly engaged with the FL half shaft 130a. In particular, the FL output 142a and the FL half shaft 130a are configured as a single shaft. The FL torque transmission control mechanism 134a further includes a FL torque transmission control device 143a configured to selectively control a gear ratio of the FL epicyclic gear train 140a. The front control unit 104 is configured to control the FL torque transmission control device.

The FL epicyclic gear train 140a is configured as a planetary gear train including a sun gear, a ring gear and a planetary carrier carrying one or more planetary gears. In the driveline 200 of FIG. 3 the ring gear of the epicyclic gear train 140a is rigidly connected to the input 141a, and the planetary carrier of the epicyclic gear train 140a is rigidly connected to the output 142a. The transmission gear 144a is configured as the sun gear of the epicyclic gear train 140a. A skilled artisan readily understands that in alternative embodiments the function of the ring gear, the sun gear and the planetary carrier of the epicyclic gear train 140a as the input 141a, the transmission gear 144a and the output 142a of the epicyclic gear train 140a, respectively, could be exchanged.

In the driveline 200 of FIG. 3, the FL torque transmission control device 143a is a clutch which is configured to selectively lock the transmission gear 144a to a stationary portion of the driveline 200 or of the vehicle, or which is configured to selectively frictionally engage the transmission gear 144a with the stationary portion. The control unit 104 is configured to vary the gear ratio between the FL input 141a and the FL output 142a of the epicyclic gear train 140a by varying the degree of frictional engagement between the transmission gear 144a and the stationary portion.

For example, by fully disengaging the transmission gear 144a from the stationary portion, the control unit 104 may interrupt the transmission of torque to the FL half shaft 130a and to the FL wheel 131a; by rigidly locking the transmission gear 144a to the stationary portion, the control unit 104 may maximize the amount of torque transmitted to the FL half shaft 130a and to the FL wheel 131a; and by partially frictionally engaging the transmission gear 144a with the stationary portion, the control unit 104 may set the percentage of torque transmitted from the FL input 141a to the FL half shaft 130a and to the FL wheel 131a to an intermediate value.

As can be seen in FIG. 3, the remaining FR, RL, and RR torque transmission control mechanisms 134b-d have the same design and may be operated according to the same modes of operation as the FL torque transmission control mechanism 134a described above.

FIG. 3 further shows that the FL input 141a of the FL torque transmission control mechanism 134a and the FR input 141b of the FR torque transmission control mechanism 134a are rigidly coupled to one another and are drivingly engaged or selectively drivingly engaged with the power source 101 through the front bevel gear set 111, the front drive shaft 110 and the gearbox 107. Specifically, the FL input 141a of the FL torque transmission control mechanism 134a and the FR input 141b of the FR torque transmission control mechanism 134b are configured as a single shaft.

In the same manner the RL input 141c of the RL torque transmission control mechanism 134c and the RR input 141d of the RR torque transmission control mechanism 134d are rigidly coupled to one another and are drivingly engaged or selectively drivingly engaged with the power source 101 through the rear bevel gear set 121, the rear drive shaft 120 and the gearbox 107. Specifically, the RL input 141c of the RL torque transmission control mechanism 134c and the RR input 141d of the RR torque transmission control mechanism 134d are configured as a single shaft.

The tables shown in FIGS. 4a, 4b illustrate various modes or methods of operating the drivelines 200 of FIG. 3. As before, each row of the tables shown in FIGS. 4a, 4b corresponds to one mode or method of operation. Again, each mode of operation is associated with a different set of control states of the RL clutch 143c, the RL brake 136c, the RR clutch 143d, the RR brake 136d, the FL clutch 143a, the FL brake 136a, the FR clutch 143b, and the FR brake 136b.

In mode 1 (standard) the control unit 104 sets the percentage of torque transmitted through the torque transmission control mechanisms 134a-d to the half shafts 130a-d to an intermediate value, respectively, by simultaneously partially frictionally engaging the clutches 143a-c with the stationary portion(s), designated by the term "MODULATE" in the tables of FIGS. 4a, 4b. In this way, torque is transmitted to all half shafts 130a-d and to all wheels 131a-d. At the same time the control unit 104 releases all brakes 136a-d. The operator of the vehicle may nonetheless manually activate the brakes 136a-d to brake the vehicle, if needed. The brakes 136a-d may be activated through a brake pedal, one or more levers or one or more switches, for example. In particular, the control unit 104 may control the gear ratios of the epicyclic gear trains 140a-d independently so that the half shafts 130a-d and the wheels 131a-d may rotate at different speeds. When operated in mode 1, the driveline 200 behaves as known drivelines featuring an open rear differential and an open front differential.

Mode 2 (100% locking) differs from mode 1 in that the control unit 104 fully locks the transmission gears 144a-d of all epicyclic gear trains 140a-d to the stationary portion(s) by fully engaging the clutches 143a-d, thereby effectively locking all half shafts 130a-d to the power source 101. Mode 2 may force both axles and all four wheels to rotate at the same speed. It may be particularly useful when traveling on slippery ground.

Mode 3 (front axle disconnect) differs from mode 1 in that the control unit 104 sets the front clutches 143a, 143b to a fully disengaged state so that no torque is transmitted to the front half shafts 130a, 130b and to the front wheels 131a, 131b. Mode 3 may be particularly suitable when the vehicle travels at high speed or when the front wheels have limited traction.

Mode 4 (rear axle disconnect) differs from mode 1 in that the control unit 104 sets the rear clutches 143c, 143d to a fully disengaged state so that no torque is transmitted to the rear half shafts 130c, 130d and to the rear wheels 131c, 131d. Mode 4 may be particularly suitable when the vehicle travels at high speed or when the rear wheels have limited traction.

Mode 5 (left side disconnect) differs from mode 1 in that the control unit 104 sets the left clutches 143a, 143c to a fully disengaged state so that no torque is transmitted to the left half shafts 130a, 130c and to the left wheels 131a, 131c. Mode 5 may be particularly suitable when the left wheels have limited traction.

Mode 6 (right side disconnect) differs from mode 1 in that the control unit 104 sets the right clutches 143b, 143d to a fully disengaged state so that no torque is transmitted to the right half shafts 130*b*, 130*d* and to the right wheels 131*c*, 131*d*. Mode 6 may be particularly suitable when the right wheels have limited traction.

Mode 7 (left super steering) differs from mode 5 (left side disconnect) in that the control unit 104 additionally sets at least one or both of the left brakes 136*a*, 136*c* to a braking state in which they inhibit rotation of at least one or both of the left half shafts 130*a*, 130*c* and/or of the left wheels 131*a*, 131*c*. Mode 7 is particularly useful when driving the vehicle around a tight left corner.

Mode 8 (right super steering) differs from mode 6 (right side disconnect) in that the control unit 104 additionally sets at least one or both of the right brakes 136*b*, 136*d* to a braking state in which they inhibit rotation of at least one or both of the right half shafts 130*b*, 130*d* and/or of the right wheels 131*b*, 131*d*. Mode 8 is particularly useful when driving the vehicle around a tight right corner.

In modes 9 to 12 (FL, FR, RL, RR single wheel traction, respectively) the control unit 104 sets only one of the clutches 143*a-d* to the fully engaged state, while simultaneously setting the remaining ones of the clutches 143*a-d* to the fully disengaged state, thereby transmitting torque to only one of the half shafts 130*a-d* and to only one of the wheels 131*a-d* at a given time.

Mode 13 (front locking) differs from mode 2 in that the control unit 104 fully engages the front clutches 143*a*, 143*b* and fully disengages the rear clutches 143*c*, 143*d*.

Mode 14 (rear locking) differs from mode 2 in that the control unit 104 fully engages the rear clutches 143*c*, 143*d* and fully disengages the front clutches 143*a*, 143*b*.

Figure 5:
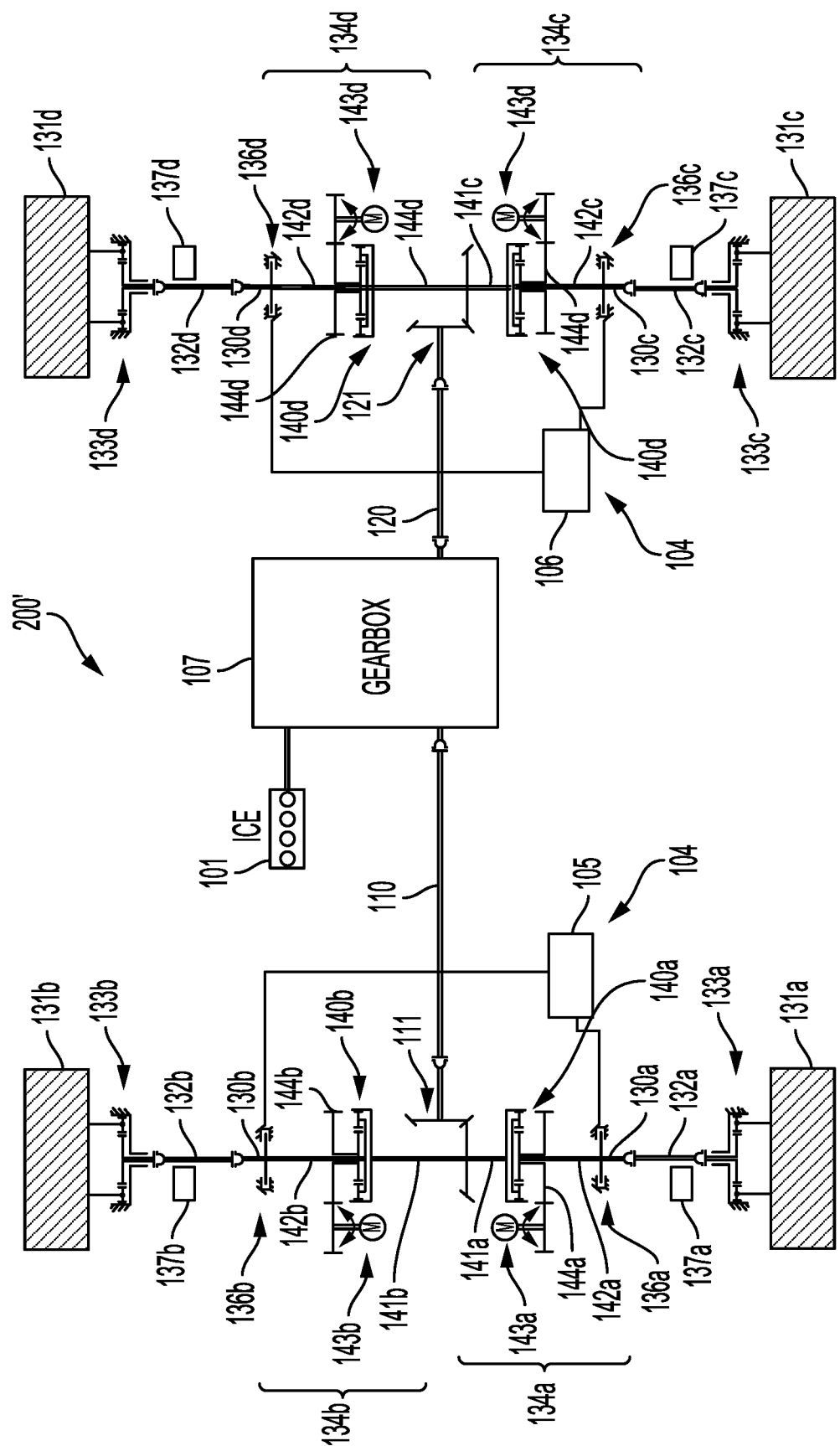
FIG. 5 a driveline for a vehicle according to a fourth embodiment.

FIG. 5 shows another driveline 200' which is a variant of the driveline 200 illustrated in FIG. 3. The driveline 200' of FIG. 5 differs from the driveline 200 of FIG. 3 in that the torque transmission control devices 143*a-d* of the torque transmission control mechanisms 134*a-d* are configured as motors fixed to a stationary portion of the driveline 200' or of the vehicle, respectively. The motors may be configured as electric motors or as hydraulic motors, for example. Outputs of the motors 143*a-d* are drivingly engaged with the transmission gears 144*a-d*, respectively. Otherwise the driveline 200' of FIG. 5 includes the same components and may be operated according to the same modes of operation as the driveline 200 of FIG. 3.

The control unit 104 is configured to independently control the motors 143*a-d*. The motors 143*a-d* may be configured as bidirectional motors. The motors 143*a-d* may be configured to add and/or subtract torque to/from the transmission gears 144*a-d* (designated by the term "MODULATE" in the tables shown in FIGS. 6*a*, 6*b*). The motors 143*a-d* may be configured to be set to a neutral state where no torque is added or subtracted to/from the transmission gears 144*a-d* through the motors 143*a-d* (designated by the term "DISENGAGED" in the tables shown in FIGS. 6*a*, 6*b*). The output of the motors 143*a-d* may be configured to be locked to the stationary portion(s), thereby effectively locking the transmission gears 144*a-d* to the stationary portion(s), respectively (designated by the term "ENGAGED" in the tables shown in FIGS. 6*a*, 6*b*).

A skilled artisan readily understands that by selectively controlling the amount of torque added and/or subtracted to/from the transmission gears 144*a-d* through the motors 143*a-d* and by selectively setting the motors 143*a-d* to their neutral state and/or to their locked state, the control unit 104 of the driveline 200' of FIG. 5 is configured to control the gear ratios of the epicyclic gear trains 140*a-d* in the same way as described above with respect to the driveline 200 of FIG. 3.

Again, the tables shown in FIGS. 6*a*, 6*b* illustrate various modes or methods of operating the driveline 200' of FIG. 5. As before, each row of the tables shown in FIGS. 6*a*, 6*b* corresponds to one mode or method of operation. Again, each mode of operation is associated with a different set of control states of the RL motor 143*c*, the RL brake 136*c*, the RR motor 143*d*, the RR brake 136*d*, the FL motor 143*a*, the FL brake 136*a*, the FR motor 143*b*, and the FR brake 136*b*.

Modes 1 to 14 according to the tables of FIGS. 6*a*, 6*b* are identical to the modes 1 to 14 according to the tables of FIGS. 4*a*, 4*b*.

As compared to the driveline 200 of FIG. 3, the driveline 200' of FIG. 5 has an additional mode 15 (electric drive, see FIG. 6*b*). Mode 15 according FIG. 6*b* differs from mode 1 according to FIG. 6*a* in that the ICE 101 provides no torque to the front and rear axle assemblies (not indicated in the table of FIG. 6*b*). This may be achieved by setting the gearbox 107 to a neutral state, thereby disengaging the drive shafts 110, 120 from the ICE 101; preferably, the shafts 110 and 120 are locked, e.g. to the gearbox case. At the same time, the control unit 104 may independently control the motors 143*a-d* to actively add and/or subtract torque to/from the transmission gears 144*a-d*, respectively. In other words, in mode 15 torque is provided to the half shafts 130*a-d* through the motors 143*a-d* only.

The invention claimed is:

1. A driveline for a vehicle, the driveline comprising:
   a power source;
   a front axle assembly drivingly engaged or selectively drivingly engaged with the power source, the front axle assembly comprising:
      a front left (FL) half shaft drivingly engaged with a front left (FL) wheel through a front left (FL) cardan shaft,
      a front right (FR) half shaft drivingly engaged with a front right (FR) wheel through a front right (FR) cardan shaft,
      a front left (FL) torque transmission control mechanism in rotatable alignment with an axis of rotation of the FL cardan shaft and configured to control transmission of torque to the FL half shaft, and
      a front right (FR) torque transmission control mechanism in rotatable alignment with an axis of rotation of the FR cardan shaft and configured to control transmission of torque to the FR half shaft, wherein the FL torque transmission control mechanism and the FR torque transmission control mechanism are selectively drivingly engaged with each other;
   a rear axle assembly drivingly engaged or selectively drivingly engaged with the power source, the rear axle assembly comprising:
      a rear left (RL) half shaft drivingly engaged with a rear left (RL) wheel through a rear left (RL) cardan shaft,
      a rear right (RR) half shaft drivingly engaged with a rear right (RR) wheel through a rear right (RR) cardan shaft,
      a rear left (RL) torque transmission control mechanism in rotatable alignment with an axis of rotation of the RL cardan shaft and configured to control transmission of torque to the RL half shaft, and
      a rear right (RR) torque transmission control mechanism in rotatable alignment with an axis of rotation of the RR cardan shaft and configured to control transmission of torque to the RR half shaft, wherein the RL torque transmission control mechanism and the RR torque transmission control mechanism are selectively drivingly engaged with each other; and a control unit configured to independently control the FL torque transmission control mechanism, the FR torque transmission control mechanism, the RL torque transmission control mechanism, and the RR torque transmission control mechanism.

2. The driveline according to claim 1,
wherein the front axle assembly includes a front locking differential, the front locking differential controllable through the control unit, the front locking differential configured to selectively lock the FL half shaft and the FR half shaft to a front differential casing, the front differential casing drivingly engaged or selectively drivingly engaged with the power source; and/or
wherein the rear axle assembly includes a rear locking differential, the rear locking differential controllable through the control unit, the rear locking differential configured to selectively lock the RL half shaft and the RR half shaft to a rear differential casing, the rear differential casing drivingly engaged or selectively drivingly engaged with the power source.

3. The driveline according to claim 2,
wherein the FL torque transmission control mechanism comprises a front left (FL) clutching device configured to selectively drivingly engage the FL half shaft with the front differential casing, and wherein the FR torque transmission control mechanism comprises a front right (FR) clutching device configured to selectively drivingly engage the FR half shaft with front differential casing; and/or
wherein the RL torque transmission control mechanism comprises a rear left (RL) clutching device configured to selectively drivingly engage the RL half shaft with the rear differential casing, and wherein the RR torque transmission control mechanism comprises a rear right (RR) clutching device configured to selectively drivingly engage the RR half shaft with the rear differential casing.

4. The driveline according to claim 1,
wherein the FL torque transmission control mechanism comprises a front left (FL) epicyclic gear train and a front left (FL) torque transmission control device, the FL torque transmission control device configured to control a gear ratio of the FL epicyclic gear train, and wherein the FR torque transmission control mechanism comprises a front right (FR) epicyclic gear train and a front right (FR) torque transmission control device, the FR torque transmission control device configured to control a gear ratio of the FR epicyclic gear train; and/or
wherein the RL torque transmission control mechanism comprises a rear left (RL) epicyclic gear train and a rear left (RL) torque transmission control device, the RL torque transmission control device configured to control a gear ratio of the RL epicyclic gear train, and wherein the RR torque transmission control mechanism comprises a rear right (RR) epicyclic gear train and a rear right (RR) torque transmission control device, the RR torque transmission control device configured to control a gear ratio of the RR epicyclic gear train.

5. The driveline according to claim 4,
wherein the FL torque transmission control device comprises a front left (FL) clutch configured to selectively engage a transmission gear of the FL epicyclic gear train with a stationary portion of the driveline, or wherein the FL torque transmission control device comprises a front left (FL) motor, the FL motor configured as an electric motor or as a hydraulic motor, the FL motor fixed to a stationary portion of the driveline and an output of the FL motor engaged with a transmission gear of the FL epicyclic gear train, and
wherein the FR torque transmission control device comprises a front right (FR) clutch configured to selectively engage a transmission gear of the FR epicyclic gear train with a stationary portion of the driveline, or wherein the FR torque transmission control device comprises a front right (FR) motor, the FR motor configured as an electric motor or as a hydraulic motor, the FR motor fixed to a stationary portion of the driveline and an output of the FR motor engaged with a transmission gear of the FR epicyclic gear train; and/or
wherein the RL torque transmission control device comprises a rear left (RL) clutch configured to selectively engage a transmission gear of the RL epicyclic gear train with a stationary portion of the driveline, or wherein the RL torque transmission control device comprises a rear left (RL) motor, the RL motor configured as an electric motor or as a hydraulic motor, the RL motor fixed to a stationary portion of the driveline and an output of the RL motor engaged with a transmission gear of the RL epicyclic gear train, and
wherein the RR torque transmission control device comprises a rear right (RR) clutch configured to selectively engage a transmission gear of the RR epicyclic gear train with a stationary portion of the driveline, or wherein the RR torque transmission control device comprises a rear right (RR) motor, the RR motor configured as an electric motor or as a hydraulic motor, the RR motor fixed to a stationary portion of the driveline and an output of the RR motor engaged with a transmission gear of the RR epicyclic gear train.

6. The driveline according to claim 5,
wherein an input of the FL epicyclic gear train and an input of the FR epicyclic gear train are permanently locked to one another and drivingly engaged or selectively drivingly engaged with the power source; and/or
wherein an input of the RL epicyclic gear train and an input of the RR epicyclic gear train are permanently locked to one another and drivingly engaged or selectively drivingly engaged with the power source.

7. The driveline according to claim 1, wherein
the front axle assembly further comprising:
    a front left (FL) brake for selectively braking the FL half shaft or the front left (FL) wheel, and
    a front right (FR) brake or selectively braking the FR half shaft or the front right (FR) wheel;
    wherein the control unit is configured to independently control the FL brake and the FR brake; and/or
the rear axle assembly further comprising:
    a rear left (RL) brake for selectively braking the RL half shaft or the rear left (RL) wheel, and
    a rear right (RR) brake for selectively braking the RR half shaft or the rear right (RR) wheel;
    wherein the control unit is configured to independently control the RL brake and the RR brake.

8. The driveline according to claim 1, further comprising speed sensors for determining a rotational speed of at least one of or all of:
    the FL half shaft, the FL wheel, the FR half shaft, the FR wheel, the RL half shaft, the RL wheel, the RR half shaft, and the RR wheel;

wherein the speed sensors are configured to transmit speed data to the control unit, wherein the control unit is configured to receive the speed data, and wherein the control unit is configured to independently control the FL torque transmission control mechanism, the FR torque transmission control mechanism, the RL torque transmission control mechanism and the RR torque transmission control mechanism based on the received speed data.

9. The driveline according to claim 8, wherein the control unit is configured to simultaneously:
control the FL, FR, RL, and RR torque transmission control mechanisms to transmit torque to the FR half shaft and to the RR half shaft and to interrupt transmission of torque to the FL half shaft and to the RL half shaft,
control the FL brake and the RL brake to brake at least one of or all of the FL half shaft, the FL wheel, the RL half shaft and the RL wheel, and
control the FR brake and the RR brake to release the FR half shaft, the FR wheel, the RR half shaft and the RR wheel; and/or wherein the control unit is configured to simultaneously:
control the FL, FR, RL, and RR torque transmission control mechanisms to transmit torque to the FL half shaft and to the RL half shaft and to interrupt transmission of torque to the FR half shaft and to the RR half shaft,
control the FR brake and the RR brake to brake at least one of or all of the FR half shaft, the FR wheel, the RR half shaft and the RR wheel, and
control the FL brake and the RL brake to release the FL half shaft, the FL wheel, the RL half shaft and the RL wheel.

10. The driveline according to claim 1, wherein the control unit is configured to control the FL, FR, RL, and RR torque transmission control mechanisms to simultaneously:
transmit torque to the FR half shaft and to the RR half shaft, and
interrupt transmission of torque to the FL half shaft and to the RL half shaft; and/or wherein the control unit is configured to control the FL, FR, RL, and RR torque transmission control mechanisms to simultaneously:
transmit torque to the FL half shaft and to the RL half shaft, and
interrupt transmission of torque to the FR half shaft and to the RR half shaft.

11. The driveline according to claim 1, wherein the control unit is configured to control the FL, FR, RL, and RR torque transmission control mechanisms to simultaneously:
transmit torque to the FL half shaft and to the FR half shaft, and
interrupt transmission of torque to the RL half shaft and to the RR half shaft; and/or wherein the control unit is configured to control the FL, FR, RL, and RR torque transmission control mechanisms to simultaneously:
transmit torque to the RL half shaft and to the RR half shaft, and
interrupt transmission of torque to the FL half shaft and to the FR half shaft.

12. The driveline according to claim 1, wherein the control unit is configured to control the FL, FR, RL, and RR torque transmission control mechanisms to transmit torque to only one of the FL, FR, RL, and RR half shafts and, simultaneously, interrupt transmission of torque to a remaining three the FL, FR, RL, and RR half shafts.

13. A method of operating a driveline, the method comprising:
providing a driveline for a vehicle, the driveline comprising:
a power source;
a front axle assembly drivingly engaged or selectively drivingly engaged with the power source, the front axle assembly comprising:
a front left (FL) half shaft drivingly engaged with a front left (FL) wheel through a front left (FL) cardan shaft,
a front right (FR) half shaft drivingly engaged with a front right (FR) wheel through a front right (FR) cardan shaft,
a front left (FL) torque transmission control mechanism in rotatable alignment with an axis of rotation of the FL cardan shaft and configured to control transmission of torque to the FL half shaft, and
a front right (FR) torque transmission control mechanism in rotatable alignment with an axis of rotation of the FR cardan shaft and configured to control transmission of torque to the FR half shaft, wherein the FL torque transmission control mechanism and the FR torque transmission control mechanism are selectively drivingly engaged with each other;
a rear axle assembly drivingly engaged or selectively drivingly engaged with the power source, the rear axle assembly comprising:
a rear left (RL) half shaft drivingly engaged with a rear left (RL) wheel through a rear left (RL) cardan shaft,
a rear right (RR) half shaft drivingly engaged with a rear right (RR) wheel through a rear right (RR) cardan shaft,
a rear left (RL) torque transmission control mechanism in rotatable alignment with an axis of rotation of the RL cardan shaft and configured to control transmission of torque to the RL half shaft, and
a rear right (RR) torque transmission control mechanism in rotatable alignment with an axis of rotation of the RR cardan shaft and configured to control transmission of torque to the RR half shaft, wherein the RL torque transmission control mechanism and the RR torque transmission control mechanism are selectively drivingly engaged with each other; and
a control unit configured to independently control the FL torque transmission control mechanism, the FR torque transmission control mechanism, the RL torque transmission control mechanism, and the RR torque transmission control mechanism; and
the method further comprising one of:
a. transmitting torque to the FR half shaft and to the RR half shaft while interrupting transmission of torque to the FL half shaft and to the RL half shaft; and
b. transmitting torque to the FL half shaft and to the RL half shaft while interrupting transmission of torque to the FR half shaft and to the RR half shaft.

14. The method of claim 13,
wherein providing the front axle assembly of the driveline further comprises:
providing a front left (FL) brake for selectively braking the FL half shaft or the front left (FL) wheel, and
providing a front right (FR) brake for selectively braking the FR half shaft or the front right (FR) wheel, wherein the control unit is configured to independently control the FL brake and the FR brake; and wherein providing the rear axle assembly of the driveline further comprises:
providing a rear left (RL) brake for selectively braking the RL half shaft or the rear left (RL) wheel, and
providing a rear right (RR) brake for selectively braking the RR half shaft or the rear right (RR) wheel, wherein the control unit is configured to independently control the RL brake and the RR brake;
the method further comprising one of:
a. simultaneously:
transmitting torque to the FR half shaft and to the RR half shaft,
interrupting transmission of torque to the FL half shaft and to the RL half shaft,
braking at least one of or all of the FL half shaft, the FL wheel, the RL half shaft, and the RL wheel, and
releasing the FR brake and the RR brake; and
b. simultaneously:
transmitting torque to the FL half shaft and to the RL half shaft,
interrupting transmission of torque to the FR half shaft and to the RR half shaft,
braking at least one of or all of the FR half shaft, the FR wheel, the RR half shaft, and the RR wheel, and
releasing the FL brake and the RL brake.

15. The method of claim 13, further comprising one of:
a. transmitting torque to the FL half shaft and to the FR half shaft while interrupting transmission of torque to the RL half shaft and to the RR half shaft; and
b. transmitting torque to the RL half shaft and to the RR half shaft while interrupting transmission of torque to the FL half shaft and to the FR half shaft.

* * * * *